United States Patent [19]

Gjertsen et al.

[11] Patent Number: 4,699,761

[45] Date of Patent: Oct. 13, 1987

[54] INTEGRAL REUSABLE LOCKING ARRANGEMENT FOR A REMOVABLE TOP NOZZLE SUBASSEMBLY OF A RECONSTITUTABLE NUCLEAR FUEL ASSEMBLY

[75] Inventors: Robert K. Gjertsen, Monroeville; John F. Wilson, Murrysville, both of Pa.

[73] Assignee: Westinghouse Electric Corp., Pittsburgh, Pa.

[21] Appl. No.: 857,675

[22] Filed: Apr. 30, 1986

[51] Int. Cl.⁴ ............................................. G21C 3/32
[52] U.S. Cl. .................................... 376/446; 376/261; 376/364; 376/440; 376/449
[58] Field of Search ............... 376/446, 261, 434, 438, 376/445, 449, 262, 362, 364, 443

[56] References Cited

U.S. PATENT DOCUMENTS

| | | | |
|---|---|---|---|
| 3,770,583 | 11/1973 | Klumb | 376/446 |
| 3,814,667 | 6/1974 | Klumb | 376/446 |
| 3,971,575 | 7/1976 | Lesham | 376/446 |
| 4,030,975 | 6/1977 | Anthony | 376/446 |
| 4,219,386 | 8/1980 | Osborne | 376/446 |
| 4,269,661 | 5/1981 | Kmonk | 376/446 |
| 4,452,755 | 6/1984 | Hylton | 376/446 |
| 4,572,816 | 2/1986 | Gjertsen | 376/261 |
| 4,603,027 | 7/1986 | Wilson | 376/446 |
| 4,618,472 | 10/1986 | Gjertsen | 376/446 |
| 4,620,960 | 11/1986 | Wilson | 376/446 |

*Primary Examiner*—Donald P. Walsh

[57] ABSTRACT

An integral reusable locking arrangement for a top nozzle of a reconstitutable fuel assembly includes a thin-walled tubular section on the upper end portion of each guide thimble of the fuel assembly above an externally threaded section thereon and an axial section on ecah alignment sleeve of the top nozzle above its lower internally threaded section. The tubular section has an annular circumferential protrusion defined thereon having an external diametric size which is greater than that of the remainder of the tubular section. The axial section on the sleeve has an internal diametric size which is greater than that of the tubular section but less than that of the protrusion. Therefore, rotational movement of the sleeve relative to the guide thimble from its raised toward its lowered position to thread its lower internally threaded section on the externally threaded section of the guide thimble causes interference contact of the axial section with the tubular section protrusion so as to produce a locking force. The locking force which must be overcome in order to unthread the internally threaded section of the sleeve from the externally threaded section of the guide thimble and detach the top nozzle from the guide thimble. The locking force takes the form of a constant torsional drag produced between the tubular section protrusion and the axial section interior surface as the sleeve is rotatably moved relative to the guide thimble between its lowered and raised positions. The circumferential protrusion on the tubular section is axilly displaced from the axial section when the internally threaded section on the sleeve is initially rotatably moved into threaded engagement with the externally threaded section on the guide thimble, whereby the mechanical advantage produced by threading the internally threaded section of the sleeve on the externally threaded section of the guide thimble can be used to overcome the torsional drag and force the sleeve onto the guide thimble.

12 Claims, 5 Drawing Figures

INTEGRAL REUSABLE LOCKING ARRANGEMENT FOR A REMOVABLE TOP NOZZLE SUBASSEMBLY OF A RECONSTITUTABLE NUCLEAR FUEL ASSEMBLY

CROSS REFERENCE TO RELATED APPLICATIONS

Reference is hereby made to the following copending applications dealing with related subject matter and assigned to the assignee of the present invention:

1. "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of copending U.S. patent application Ser. No. 457,790 filed Jan. 13, 1983.

2. "Improved Removable Top Nozzle Subassembly For A Reconstitutable Nuclear Fuel Assembly" by John F. Wilson et al, assigned U.S. Ser. No. 701,049 and filed Feb. 12, 1985.

BACKGROUND OF THE INVENTION

1. Field of the Invention

The present invention relates generally to reconstitutable fuel assemblies for nuclear reactors and, more particularly, is concerned with an integral reusable locking arrangement for a removable top nozzle which requires no replacement components nor remote manipulations and thereby reduces the complexity of the fuel assembly reconstitution operation.

2. Description of the Prior Art

Conventional designs of fuel assemblies include a mulitiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pats. 3,770,583 and 3,814,667 to Klumb et al and 4,269,661 to Kmonk et al, and in the first patent application cross-referenced above.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable to nozzle. The top nozzle is mechanically fastened usually by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its useful life.

One recently proposed design for a reconstitutable fuel assembly top nozzle is described and illustrated in the second patent application crossreferenced above. The proposed top nozzle overcomes certain problems associated with the removable top nozzle designs of the above-cited U. S. patents and patent application. Specifically, it includes improved structures which eliminate relative moving contact or sliding engagement between the upper core support plate and the hold-down structure of the top nozzle while providing removable mounting of the top nozzle as a unitary subassembly on the guide thimbles of the reconstitutable fuel assembly as well as desired alignment of the fuel assembly with the upper core plate. Relative motion between the upper core plate and alignment sleeves of the top nozzle still takes place but without damaging contact with one another. Also, deleterious affects on the hold-down springs of coolant cross-flow between fuel assemblies is substantially eliminated in the proposed top nozzle by the incorporation of an enclosure wall about the perimeter of the top nozzle which protects the springs from flow induced vibration.

The proposed top nozzle includes an upper hold-down plate which compresses a plurality of holddown springs, preferably four in number, against a lower adapter plate. Lugs associated with the upper hold-down plate and the enclosure associated with the lower adapter plate are slidably coupled together via shear pins which restrict their relative movement away from each other but allow movement toward each other. Elongated alignment sleeves at their upper ends extend through passageways in the upper hold-down plate and at their lower ends are releasably threaded to the upper ends of the guide thimbles which extend upwardly through holes in the lower adapter plate. In such arrangement, when the lower ends of the alignment sleeves are tightened against the adapter plate, they cooperate with lower retainers on the guide thimbles below the adapter plate to mount the top nozzle via the adapter plate on the guide thimbles. Conversely, for removal of the top nozzle, the alignment sleeves are unthreaded from the guide thimbles. The sleeves remain captured between the upper hold-down and lower adapter plates, as also do the respective hold-down springs which encompass the sleeves, after the sleeves are threadably disconnected from the guide thimbles and the top nozzle is removed as a unit from the fuel assembly.

While the proposed removable top nozzle design of the second cross-referenced patent application, as just briefly described, has proven to be a highly satisfactory solution to the problems previously existing, it has been recently recognized that it is desirable to provide some additional means to ensure that the top nozzle remains attached to the guide thimbles during in-core operation subsequent to reconstitution. Heretofore, locking techniques employed to prevent in-service loosening of the top nozzle attachment have taken several forms, such as; swagged locking cups on cap screws, swagged expansions of tubes into collars, welded lock pins, etc.

Regardless of the locking technique employed, one similarity exists between them all: they require handling of loose parts for disassembly and replacement of the locking feature (i.e., a new lock pin, locking cup, etc.) for both top nozzle removal and replacement operations and elaborate remote tooling to accomplish the removal and relocking tasks.

Consequently, a need exists for a different approach to locking the removable top nozzle to the guide thimbles of the reconstitutable fue assembly, one with the objective of accommodating the beneficial design features of the top nozzle disclosed in the second cross-referenced application while avoiding the complicated locking techniques employed in the past.

SUMMARY OF THE INVENTION

The present invention provides an integral reusable locking arrangement for the removable top nozzle designed to satisfy the aforementioned needs. While the threaded joints connecting the top nozzle to the guide thimbles are still employed, a locking arrangement is integrally incorporated which is reusable and requires no special tooling to actuate it. Basically, as before, the alignment sleeves are just unthreaded from and rethreaded onto the upper ends of the guide thimbles to remove and replace the top nozzle. There is no need for replacement components nor additional remote operations such as the making of expansions or swages as commonly used in previously existing designs. As a result, the complexity of the fuel assembly reconstitution operation is greatly reduced.

Accordingly, the present invention is set forth in a reconstitutable fuel assembly having at least one control rod guide thimble and a top nozzle. The control rod guide thimble includes an upper end portion having an annular externally threaded section. The top nozzle includes at least one tubular alignment sleeve having a lower annular internally threaded section. The alignment sleeve is rotatably movable relative to the guide thimble upper end portion between lowered and raised positions for threading and unthreading its internally threaded section onto and from the externally threaded section of the guide thimble upper end portion for attaching and detaching the top nozzle onto and from the guide thimble. The present invention provides an integral reusable locking arrangement for the top nozzle comprising: (a) inner means mounted on the guide thimble upper end portion above the externally threaded section thereon; and (b) outer means mounted on the alignment sleeve above the internally threaded section thereon: (c) the inner and outer means being configured to coact with one another as the internally threaded section of the alignment sleeve is threaded on the externally threaded section of the guide thimble upper end portion when attaching the top nozzle to the guide thimble and to provide a locking force which must be overcome in order to unthread the internally threaded section of the alignment sleeve from the externally threaded section of the guide thimble upper end portion for detaching the top nozzle from the guide thimble. The locking force takes the form of a constant torsional drag produced between the inner and outer means as the alignment sleeve is rotatably moved relative to the guide thimble upper end portion between the lowered and raised positions.

Additionally, the outer means on the alignment sleeve and the inner means on the guide thimble upper end portion are axially displaced from one another when the internally threaded section on the alignment sleeve is initially rotatably moved into threaded engagement with the externally threaded section on the guide thimble upper end portion whereby the mechanical advantage produced by threading the internally threaded section of the alignment sleeve onto the externally threaded section of the guide thimble upper end portion can be used to overcome the locking force as the alignment sleeve is threaded onto the guide thimble upper end portion.

More particular, the inner means takes the form of a thin-walled tubular section on the guide thimble upper end portion having a first external diametric size and an enlarged region defined thereon of a second external diametric size which is greater than the first external diametric size of the remainder of the tubular section. The outer means takes the form of an axial section on the alignment sleeve having a third internal diametric size which is greater than the first external diametric size of the thin-walled tubular section on the guide thimble upper end portion but less than the second external diametric size of the enlarged region on the tubular section, whereby rotational movement of the alignment sleeve relative to the guide thimble upper end portion from the raised toward the lowered position causes interference contact of the axial section of the alignment sleeve with the tubular section enlarged region of the guide thimble upper end portion so as to produce the locking force. Specifically, the enlarged region takes the form of a circumferential protrusion on the tubular section.

These and other advantages and attainments of the present invention will become aparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Figure 1:
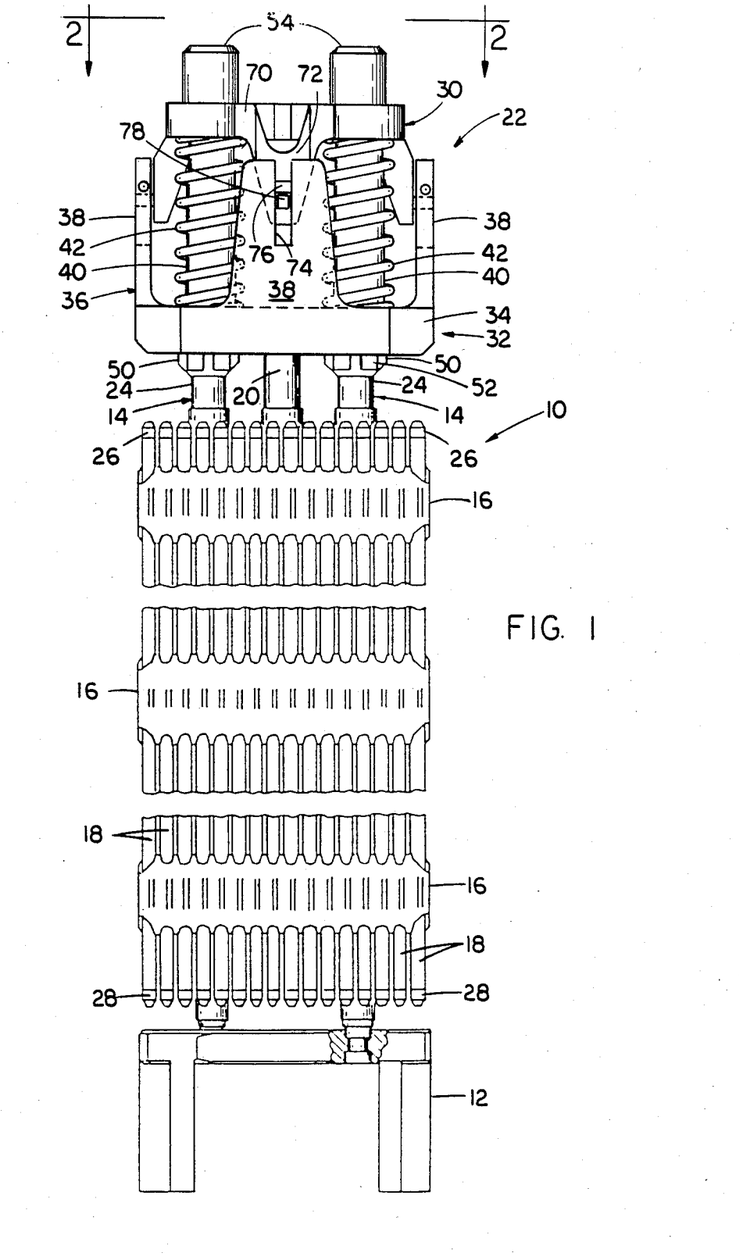
FIG. 1 is an elevational view, with parts broken away for clarity, of a reconstitutable fuel assembly having an integral reusable arrangement for locking the removable top nozzle on the guide thimbles of the assembly in accordance with the principles of the present invention.

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper end portions 24 of the guide thimbles 14 which together incorporate certain locking features in accordance with the present invention which will be fully described below. With such arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs 26,28. The fuel pellets composed of fissile material are responsible for creating the reactive power of the reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components forming the top nozzle 22 and their attachment to the upper end portions 24 of the guide thimbles 14, along with the integral locking features of the present invention, must accommodate the movement of the control rods into the guide thimbles 14 from above the top nozzle 22.

TOP NOZZLE REMOVABLY MOUNTED ON GUIDE THIMBLES

Figure 2:
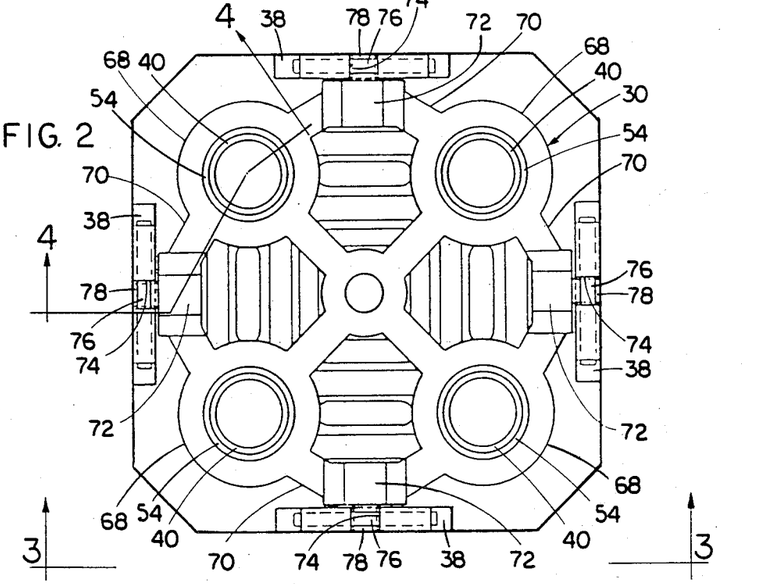
FIG. 2 is an enlarged top plan view of the reconstitutable fuel assembly as seen along line 2—2 of FIG. 1, showing the top nozzle incorporating the integral reusable locking arrangement of the present invention.
Figure 3:
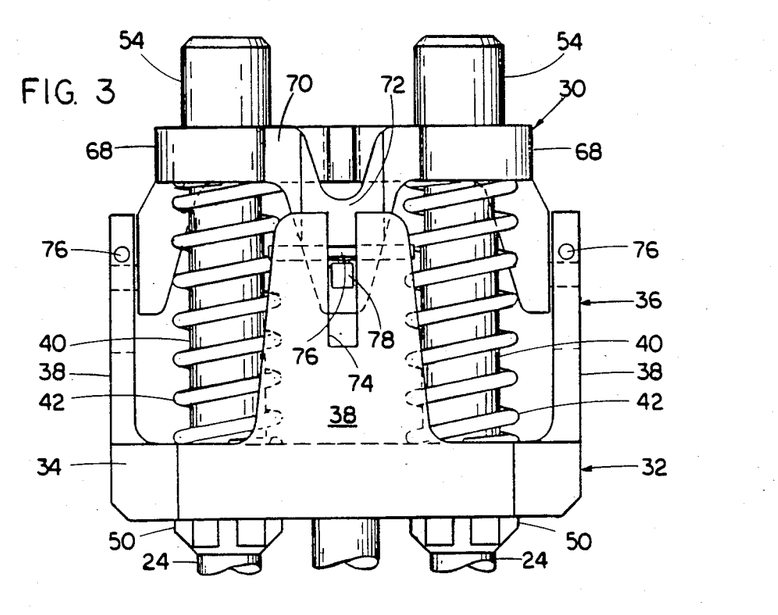
FIG. 3 is an enlarged elevational view of the removable top nozzle as seen along line 3—3 of FIG. 2.

Turning now to FIGS. 2 and 3, as well as Fig. 1, there is shown in greater detail the separate components making up the top nozzle 22 which is removably mounted on the upper end portions 24 of the guide thimbles 14 of the fuel assembly 10. The top nozzle 22 basically includes an upper hold-down plate 30, an enclosure 32 having a lower adapted plate 34 and an upstanding discontinuous sidewall 36 formed by a plurality of spaced upstanding wall portions 38 surrounding and attached to the periphery of the adapter plate, a plurality of tubular alignment sleeves 40 disposed between the upper and lower plates 30,34, and a plurality of hold-down coil springs 42 extending between the upper and lower plates 30,34 and about the respective sleeves 40. The upper hold-down plate 30 has a plurality of passageways 44 defined therethrough, while the lower adapter plate has a plurality of openings 46, the passageways 44 and openings 46 being arranged in respective patterns which are matched to that of the guide thimbles 14 of the fuel assembly 10.

More particularly, the upper end portions 24 of the guide thimbles 14 extend upwardly through the openings 46 in the lower adapter plate 34 and above the upper surface 48 thereof. A plurality of lower retainers 50 are attached, such as by brazing, to the guide thimbles 14 below the lower adapter plate 34 for limiting downward slidable movement of the adapter plate 34 relative to the guide thimbles 14 and thereby supporting the adapter plate on the guide thimbles with the upper end portions 26 thereof extending above the adapter plate. Each lower retainer 50 on one guide thimble 14 has a series of scallops 52 formed on its periphery which are aligned with those of the fuel rods 18 grouped about the respective one guide thimble so that the fuel rods may be removed and replaced during reconstitution of the fuel assembly 10.

Figure 5:
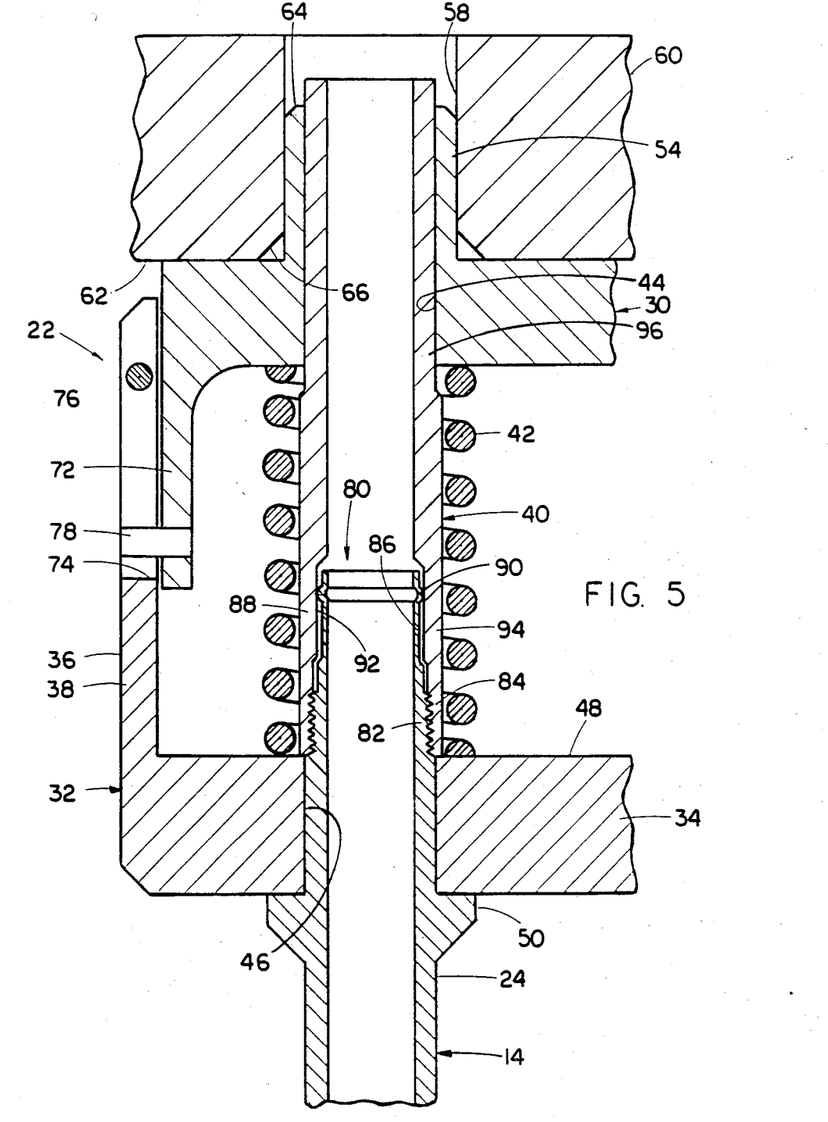
FIG. 5 is another enlarged fragmentary view similar to that of FIG. 4, but showing the alignment sleeve of the top nozzle threaded onto the upper end of the guide thimble and the portion of the integral reusable locking arrangement of the present invention associated with the one alignment sleeve and guide thimble in an assembled or locked condition.

Furthermore, the top nozzle 22 includes a plurality of upstanding bosses 54 having respective central bores 56 defined therethrough. The bosses 54 are disposed above the upper hold-down plate 30, and each boss is attached to the hold-down plate 30 such that its central bore 56 is aligned with a respective one of the passageways 44 of the hold-down plate. Additionally, each boss 54 is of a cross-sectional size adapted to interfit within one of a plurality of holes 58 (only one of which is seen in FIG. 5) formed in the upper core plate 60 which opens at a lower side 62 of the core plate. The upper circumferential edge 64 of each boss 54 is chamfered for mating with a complementarily chamfered edge 66 on the lower side 62 of the upper core plate 60 at the entrance to each of the holes 58 defined therein. Edges having such shapes act as guiding surfaces which facilitate alignment and insertion of the respective bosses 54 into the corresponding holes 58 in the upper core plate 60 during installation of the fuel assembly 10 within the reactor core.

As mentioned above, the hold-down coil springs 42 are disposed about the respective elongated alignment sleeves 40 within the enclosure 32. Further, the springs 42 extend between the lower adapter plate 34 and the upper hold-down plate 30 and support the upper plate in a spaced relation above the lower plate at a stationary position in which the upper plate abuts the lower side 62 of the upper core plate 60 with the upstanding bosses 54 interfitted within the holes 58 of the upper core plate 60. Also, the upper hold-down plate 30 is composed of an array of hubs 68 and ligaments 70 which extend between and interconnect the hubs. Each of the hubs 68 has one of the passageways 44 defined therethrough. Furthermore, one boss 54 is disposed above and connected to each of the hubs 68 with the bore 56 of the boss aligned with the respective passageway 44 of the hub.

Finally, the top nozzle 22 includes means interconnecting the spaced upper and lower plates 30,34 so as to accommodate movement of the lower plate 34 toward and away from the upper plate 30 upon axial movement of the guide thimbles 14 of the fuel assembly 10, such as due to thermal growth, toward and away from the upper core plate 60. Also, the interconnecting means is effective to limit movement of the lower adapter plate 34 away from the upper hold-down plate 30 so as to maintain the springs 42 in a state of compression therebetween. In particular, the interconnecting means includes a plurality of lugs 72 connected to and extending downwardly from peripheral ones of the ligaments 70. The lugs 72 are respectively coupled to the upstanding wall portions 38 of the discontinuous sidewall 36 of the enclosure 32. Specifically, a generally vertical slot 74 is formed in each wall portion 38 and opens at the upper end thereof. A removable locking pin 76 is inserted horizontally into the upper end of the wall portion 38 to close the upper end of the slot 74 and a pin 78 mounted in the lower end of each lug 72 extends into the slot 74 below the locking pin 76 for slidable movement therealong as the upper and lower plates 30,34 move relative to one another. In such arrangement, the locking pin 76 and the lower end of the slot 74 respectively define the limits of movement of the lower adapter plate 34 toward and away from the upper hold-down plate 30.

Integral Reusable Locking Arrangement for Top Nozzle

Figure 4:
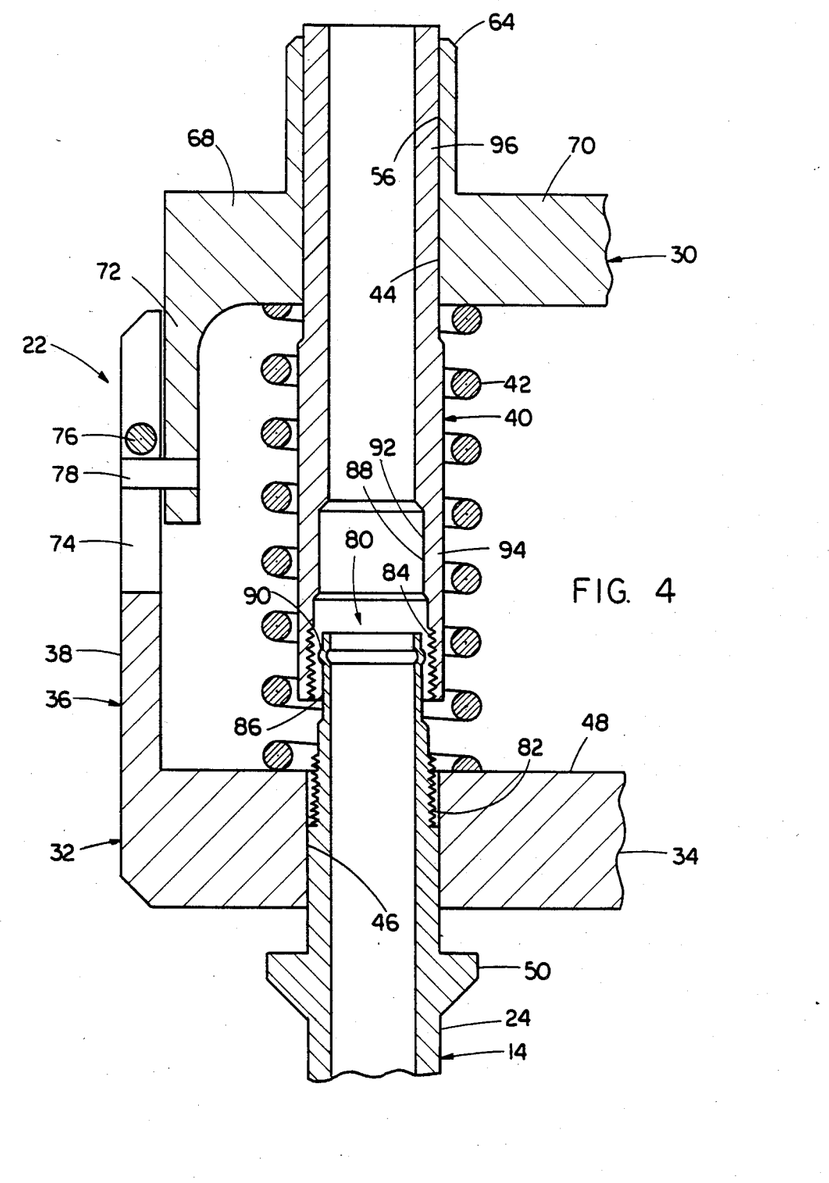
FIG. 4 is an enlarged fragmentary sectional view of the top nozzle and an upper end of one guide thimble of the fuel assembly as taken along line 4—4 of FIG. 2, showing an alignment sleeve of the top nozzle unthreaded from the upper end of the guide thimble and the portion of the integral reusable locking arrangement of the present invention associated with the one alignment sleeve and guide thimble in a disassembled or unlocked condition.

Referring now to FIGS. 4 and 5, there is shown one of the elongated tubular alignment sleeves 40 extending through one of the hold-down coil springs 42 between the upper and lower plates 30,34 and the threaded features on the sleeve 40 and on the upper end portion 24 of the one guide thimble 14 illustrated in the figures for attaching the sleeve and guide thimble together. Also illustrated in these figures is the reusable locking arrangement, generally designated as 80, integrally associated with both the sleeve 40 and the guide thimble upper end portion 24 for locking the attached sleeve and guide thimble together.

With respect to the threaded features on the guide thimble 14 and sleeve 40, the upper end portion 24 of the guide thimble 14 has an annular externally threaded section 82, whereas the tubular alignment sleeve 40 has a lower annular internally threaded section 84. The sleeve 40 is mounted through the passageway 44 and bore 56 of the hold-down plate hub 68 and boss 54 for rotatable movement relative to the guide thimble upper end portion 24 between lowered and raised positions, as depicted respectively in FIGS. 5 and 4, for threading and unthreading its internally threaded section 84 onto and from externally threaded section 82 of the guide thimble upper end portion 24 in order to attach and detach the top nozzle 22 onto and from the guide thimble 14. The sleeve 40 is hollow so that, in addition to accommodating insertion of a control rod through it, a suitable tool (not shown) can be inserted into the sleeve for gripping it internally to rotate it in either direction for threading on and unthreading from the upper end portion 24 of the guide thimble 14. When threaded on the guide thimble upper end portion 24, the sleeve 40 cooperates with the lower retainer 50 to clamp the adapter plate 34 therebetween.

The integral reusable locking arrangement 80 for the top nozzle 22 includes inner means in the form of a thin-walled tubular section 86 on the guide thimble upper end portion 24 above its externally threaded section 82 and outer means in the form of an axial section 88 on the alignment sleeve 40 above its internally threaded section 84. The tubular section 86 has an enlarged region in the form of an annular circumferential protrusion 90 defined thereon. The protrusion 90 has an external diametric size which is greater than the external diametric size of the remainder of the tubular section 86. The protrusion 90 can be machined around the entire tubular section 86, or can alternately be formed by an expansion (or bulge) operation or take the form of local dimples. The axial section 88 on the alignment sleeve 40 has an internal diametric size which is greater than that of the tubular section 86 but less than that protrusion 90 on the tubular section. With such diametric relationships between the axial section 88 and the protrusion 90, rotational movement of the alignment sleeve 40 relative to the guide thimble upper end portion 24 from its raised toward its lowered position causes interference contact of the axial section 88 with the tubular section protrusion 90 so as to produce a locking force. Additionally, it will be noticed in FIG. 4 that diametric sizes of the tubular section 86 and protrusion 90 are less than that of the exterior diametric size of the externally threaded section 82 of the guide thimble upper end portion 24, and, similarly, the diametric size of the axial section 88 is less than that of the interior diametric size of the internally threaded section 84 of the alignment sleeve 40.

Thus, the protrusion 90 on the tubular sleeve 40 coacts with the interior surface 92 of the axial section 88 on the alignment sleeve 40 by creating an interference fit therewith as the internally threaded section 80 of the sleeve 40 is threaded on the externally threaded section 82 of the guide thimble upper end portion 24 when attaching the top nozzle 22 to the guide thimble 14. The interference fit causes the locking force which must be overcome in order to unthread the internally threaded section 84 of the alignment sleeve 40 from the externally threaded section 82 of the guide thimble upper end portion 24 and detach the top nozzle 22 from the guide thimble 14. The locking force takes the form of a constant torsional drag produced between the tubular section protrusion 90 and the axial section interior surface 92 as the alignment sleeve 40 is rotatably moved relative to the guide thimble upper end portion 24 between its lowered and raised positions. During in-core operation there are no appreciable loads acting on these threaded joints. Hence, the drag force, which prevents loosening of the sleeve 40, can be relatively low. It will be noted that unlike a lock washer where total loosening occurs upon small rotation, the interference drag force will act throughout the unthreading operation.

An examination of FIG. 4 reveals that the circumferential protrusion 90 on the tubular section 86 is axially displaced from the axial section 88 when the internally threaded section 84 on the alignment sleeve 40 is initially rotatably moved into threaded engagement with the externally threaded section 82 on the guide thimble upper end portion 24. In such arrangement where engagement between the threaded ends of the sleeve 40 and guide thimble 14 leads interference contact between the protrusion 90 and the interior surface 92 of the axial section 88, the mechanical advantage produced by threading the internally threaded section 84 of the sleeve 40 on the externally threaded section 82 of the guide thimble 14 can be used to overcome the torsional drag and force the sleeve onto the guide thimble.

When all of the sleeves 40 are unthreaded from the upper end portions 24 of the respective guide thimbles 14, the top nozzle 22 is in condition for removal from the remainder of the fuel assembly 10 for reconstitution thereof. However, due to the cross-sectional size of each of the sleeves 40, it stays in place between the upper and lower plates 30,34 of the top nozzle. Particularly, each sleeve 40 has a lower portion 94 of a cross-sectional diameter that is greater than that of an upper portion 96 thereof and also greater than the size of the diameter of the one passageway 44 of the upper hold-down plate 30. Thus, the sleeve 40 cannot be withdrawn through the passageway 44 and so it remains captured between the upper and lower plates 30,34, as also does the respective hold-down coil spring 42 encompassing the sleeve 40, when each sleeve is released from its threaded connection with its respective guide thimble 14.

It is thought that the present invention and many of its attendant advantages will be understood from the foregoing description and it will be apparent that various changes may be made in the form, construction and arrangement thereof without departing from the spirit and scope of the invention of sacrificing all of its material advantages, the form hereinbefore described being merely a preferred or exemplary embodiment thereof.

We claim:

1. In a reconstitutable fuel assembly having at least one control rod guide thimble and a top nozzle, said guide thimble including an upper end portion having an annular externally threaded section, said top nozzle including at least one tubular alignment sleeve having a lower annular internally threaded section and being rototably movable relative to said guide thimble upper end portion between lowered and raised positions for threading and unthreading its internally threaded section onto and from said externally threaded section of said guide thimble upper end portion for attaching and detaching said top nozzle onto and from said guide thimble, and intergral reusable locking arrangement for said top nozzle comprising:
   (a) inner means mounted on said guide thimble upper end portion above said externally threaded section thereon; and
   (b) outer means mounted on said alignment sleeve above said internally threaded section thereon;
   (c) said inner and outer means being configured to coact with one another as said internally threaded section of said alignment sleeve is threaded on said externally threaded section of said guide thimble upper end portion when attaching said top nozzle to said guide thimble and to provide a locking force which must be overcome in order to unthread said internally threaded section of said alignment sleeve from said externally threaded section of said guide thimble upper end portion for detaching said top nozzle from said guide thimble.

2. The locking arrangement as recited in claim 1, wherein said locking force takes the form of a constant torsional drag produced between said inner and outer means as said alignment sleeve is rotatably moved relative to said guide thimble upper end portion between said lowered and raised positions.

3. The locking arrangement as recited in claim 1, where said outer means on said alignment sleeve and said inner means on said guide thimble upper end portion are axially displaced from one another when said internally threaded section on said alignment sleeve is initially rotatably moved into threaded engagement with said externally threaded section on said guide thimble upper end portion whereby the mechanical advantage produced by threading said internally threaded section of said alignment sleeve onto said externally threaded section of said guide thimble upper end portion can be used to overcome said locking force as said alignment sleeve is threaded onto said guide thimble upper end portion.

4. The locking arrangement as recited in claim 1, wherein said inner means takes the form of a thin-walled tubular section on said guide thimble upper end portion having a first external diametric size and an enlarged region defined thereon of a second external diametric size which is greater than said first external diametric size of the remainder of said tubular section.

5. The locking arrangement as recited in claim 4, wherein said outer means takes the form of an axial section on said alignment sleeve having a third internal diametric size which is greater than said first external diametric size of said thin-walled tubular section on said guide thimble upper end portion but less than said second external diametric size of said enlarged region on said tubular section, whereby rotational movement of said alignment sleeve relative to said guide thimble upper end portion from said raised toward said lowered position causes interference contact of said axial section of said alignment sleeve with said tubular section enlarged region of said guide thimble upper end portion so as to produce said locking force.

6. The locking arrangement as recited in claim 5, wherein said enlarged region takes the form of a circumferential protrusion on said tubular section.

7. The locking arrangement as recited in claim 1, wherein:
   said inner means takes the form of a thin-walled tubular section on said guide thimble upper end portion having a first external diametric size;
   said outer means takes the form of an axial section on said alignment sleeve having a second internal diametric size which is greater than said first external diametric size of said thin-walled tubular section for accommodating insertion of said tubular section into said axial section; and
   a protruding region is defined on one of said tubular and axial sections and has a third diametric size being proportioned relative to said first and second diametric sizes of said respective tubular and axial sections whereby rotational movement of said alignment sleeve relative to said guide thimble upper end portion from said raised toward said lowered position causes interference contact of said protruding region with the other of said tubular and axial sections so as to produce said locking force as said internally threaded section of said alignment sleeve is threaded onto said externally threaded section of said guide thimble upper end portion.

8. The locking arrangement as recited in claim 7, wherein said locking force takes the form of a constant torsional drag produced between said protruding region and said other of said tubular and axial sections as said alignment sleeve is rotatably moved relative to said guide thimble upper end portion between said lowered and raised positions.

9. The locking arrangement as recited in claim 7, wherein said protruding region on said one of said tubular and axial sections is axially displaced from said other of said tubular and axial sections when said internally threaded section on said alignment sleeve is initially rotatably moved into threaded engagement with said externally threaded section on said guide thimble upper end portion whereby the mechanical advantage produced by threading said internally threaded section of said alignment sleeve onto said externally threaded section of said guide thimble upper end portion can be used to overcome said locking force as said alignment sleeve is threaded onto said guide thimble upper end portion.

10. The locking arrangement as recited in claim 7, wherein said first diametric size of said tubular section is less than the exterior diametric size of said externally threaded section of said guide thimble upper end portion.

11. The locking arrangement as recited in claim 7, wherein said second diametric size of said axial section is less than the interior diametric size of said internally threaded section of said alignment sleeve.

12. The locking arrangement as recited in claim 7, wherein said enlarged region takes the form of a circumferential protrusion on said tubular section.

* * * * *